(12) United States Patent
Maeda et al.

(10) Patent No.: US 7,251,418 B2
(45) Date of Patent: Jul. 31, 2007

(54) SIGNAL RECEIVER HAVING LIGHT GUIDE FOR GUIDING LIGHT TRANSMITTED FROM REMOTE CONTROL

(75) Inventors: Osamu Maeda, Osaka (JP); Katsuhiro Morisada, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 773 days.

(21) Appl. No.: 10/373,108

(22) Filed: Feb. 26, 2003

(65) Prior Publication Data

US 2003/0175038 A1    Sep. 18, 2003

(30) Foreign Application Priority Data

Mar. 12, 2002    (JP) .............................. 2002-067607

(51) Int. Cl.
*H04B 10/06* (2006.01)
*G02B 6/42* (2006.01)
*G02B 6/44* (2006.01)

(52) U.S. Cl. ....................... 398/214; 398/207; 398/141; 385/32; 385/39; 385/104

(58) Field of Classification Search ................ 398/202, 398/214, 207, 141; 385/28, 32, 39, 50, 104, 385/111, 35, 41, 42
See application file for complete search history.

(56) References Cited

U.S. PATENT DOCUMENTS 4,884,112 A * 11/1989 Lorenzo et al. ............... 257/86
5,459,804 A * 10/1995 Stowe ......................... 385/42
5,987,205 A    11/1999 Moseley et al.

FOREIGN PATENT DOCUMENTS

| JP | 59-44085 | 3/1984 |
|---|---|---|
| JP | 63-181085 | 11/1988 |
| JP | 64-33793 | 3/1989 |
| JP | 05-199179 | 6/1993 |
| JP | 7-212318 | 8/1995 |
| JP | 07-220326 | 8/1995 |
| JP | 8-191493 | 7/1996 |
| JP | 3041970 | 7/1997 |
| JP | 10-210578 | 8/1998 |
| JP | 10-243481 | 9/1998 |
| JP | 3065309 | * 10/1999 |
| JP | 3065909 | 10/1999 |
| JP | 63-181085 | * 11/1999 |
| JP | 2000-221356 | 8/2000 |
| JP | 2000-243985 | 9/2000 |
| JP | 2001-148666 | 5/2001 |

* cited by examiner

*Primary Examiner*—M. R. Sedighian
(74) *Attorney, Agent, or Firm*—Crowell & Moring LLP

(57) ABSTRACT

A signal receiver which receives an optical signal from a remote control includes a light guide for guiding a light passing through a front panel window toward a photodetector mounted on a circuit board. The light guide is made of a homogeneous material. A light guiding portion of the light guide extending from an entrance end to an exit end has a substantially circular cross section and is curved gently, not angularly. The exit end is configured to have a concave surface which is coaxial with the axes of both the cross section of the light guiding portion and a light-receptive portion of the photodetector. The exit end is disposed adjacent and opposite to the light-receptive portion.

5 Claims, 3 Drawing Sheets

FIG. 3
A-A SECTION
(B-B SECTION)
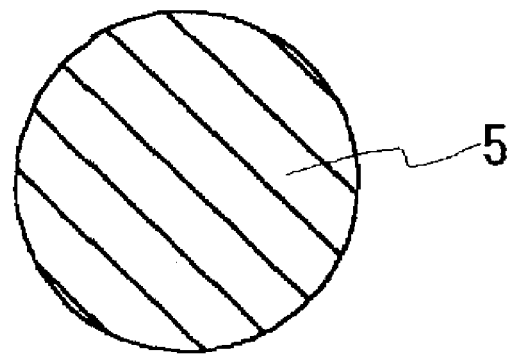
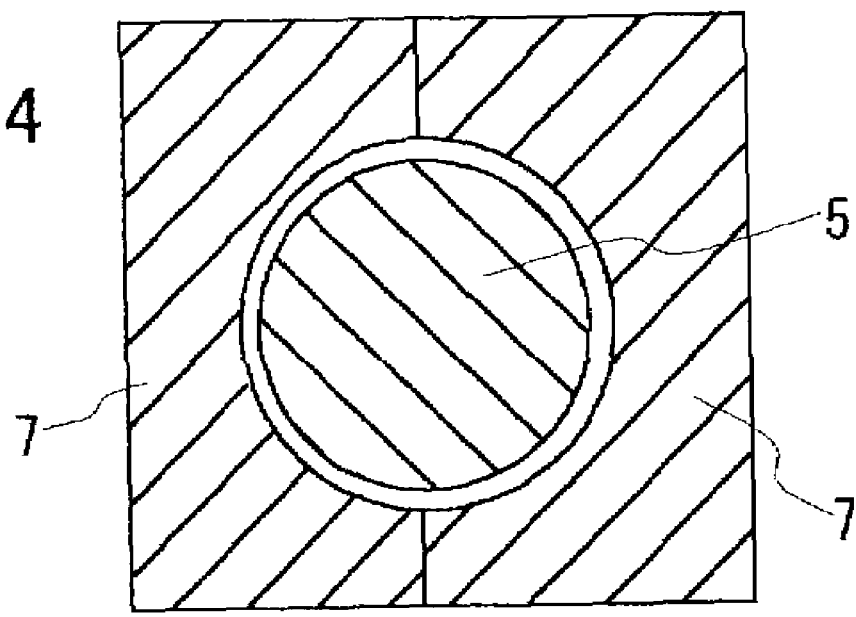
FIG. 4

SIGNAL RECEIVER HAVING LIGHT GUIDE FOR GUIDING LIGHT TRANSMITTED FROM REMOTE CONTROL

BACKGROUND OF THE INVENTION

The present invention relates to an apparatus for receiving an optical signal transmitted from a remote control and converting the signal to an electric signal. More particularly, the present invention relates to a signal receiver for a remote control system in which a photodetector is disposed so as to have a directivity thereof substantially perpendicular to a direction in which a light enters through a front panel window.

There have been conventionally provided a variety of signal receivers which comprise a light guide for guiding an optical signal passing through a window toward a photodetector mounted on a circuit board. For example, a signal receiver is known which is designed to improve the strength of the light guide and permit a light to be received at various angles by making, out of a translucent resin material, the columnar portion of the light guide integrally with ribs for strengthening it (e.g., Japanese Utility Model No. 3041970).

There is also known a signal receiver which is configured to provide a front panel of the receiver with a tunnel through which an optical signal passes so that the optical signal is reflected by the inner wall of the tunnel to be guided to a photodetector (e.g., Japanese Patent Laid-open Publication No. HEI 10-210578).

A signal receiver is also known which employs an optical fiber as a light guide for guiding an optical signal (e.g., Japanese Utility Model Laid-open Publication No. SHO 63-181085). In a tape deck, there is known a light guiding apparatus capable of detecting the starting and ending points of a tape by guiding a light with an optical fiber in the same manner as the above (e.g., Japanese Patent Laid-open Publication No. HEI 7-220326).

Further, there is known a signal receiver which has a plurality of reflection surfaces on the surface of a light guide to permit a reflection of a light entering a window in arbitrary directions, thereby causing the relative position between the window and a photodetector to be set freely (e.g., Japanese Patent Laid-open Publication No. HEI 5-199179).

FIGS. 5 and 6 show a known signal receiver which is configured to guide an optical signal entering through a window of a front panel 2 toward a photodetector 4 through a light guide 9 of a substantially rectangular column (e.g., Japanese Utility Model No. 3065309). Here, FIG. 6 illustrates a C-C section of the light guide 9 and the same section of a metal mold 10 for forming the light guide 9. It can be seen that, when the metal mold 10 is configured rectangular in section, a shrinkage by cooling after molding causes the light guide 9 to have a section where each side is hollow in the middle with respect to the metal mold 10.

Further, a signal receiver is known that has a front panel provided with a stand for holding a circuit board (e.g., Japanese Utility Model Laid-open Publication Nos. SHO 59-44085 and SHO 64-33793).

As shown in FIG. 5, in a signal receiver for a remote control system or the like, a circuit board 3 is typically disposed adjacent to the bottom of the receiver at substantially a right angle to the front panel 2 so as to make the receiver small. The photodetector 4 is generally mounted directly on the circuit board 3 without a frame or other mounting construction, as disclosed in Japanese Utility Model No. 3065309, so as to enhance the freedom in design and reduce in production cost of the receiver. The photodetector 4 mounted directly on the circuit board 3 has a directivity in the normal direction on the circuit board 3, that is, at substantially a right angle to a direction of incidence L1 of an optical signal passing through the window of the front panel 2. Thus, it is required to guide the optical signal by using the light guide 9 so as to change its direction at substantially a right angle.

In the signal receiver disclosed in Japanese Utility Model No. 3041970, however, it is not taken into consideration to enable the light guide to change the direction of an optical signal at substantially a right angle, thereby the receiver failing to mount the photodetector directly on the circuit board. The signal receiver disclosed in Japanese Patent Laid-open Publication No. HEI 10-210578 is configured to guide an optical signal toward the photodetector mounted directly on the circuit board by bending the tunnel. However, the window in the receiver is configured to be open, thereby failing to prevent an invasion of foreign substances. If a foreign substance enters onto the photodetector, the photodetection performance of the receiver is markedly reduced. Thus, it is required some step such as covering the window with a transparent member. Such a step, however, causes the range within which a light can be received to be extremely limited due to the influence of surface reflection, thus a problem may arise in utility.

The receiver disclosed in Japanese Utility Model Laid-open Publication No. SHO 63-181085 and the apparatus disclosed in Japanese Patent Laid-open Publication No. HEI 7-220326 employ an optical fiber as a light guide to be remarkably limited in angle at which a light can be received. Thus, such a configuration is not suitable for a signal receiver which requires receiving optical signals emitted from various directions. Additionally, an optical fiber is expensive due to its two-layered structure consisting essentially of a core layer and a clad layer, thereby increasing the production cost of the receiver.

In the signal receiver disclosed in Japanese Patent Laid-open Publication No. HEI 5-199179, it is necessary to deposit a reflection layer made of aluminum or the like onto the outside of the reflection surfaces of the light guide. Thus, the receiver is increased in production cost. Further, the light guide disclosed in the above has a substantially rectangular cross section and has angular portions at the outside. In such a configuration, a light may leak through the angular portion, then the efficiency in utilizing a light is lowered. The signal receiver disclosed in Japanese Utility Model No. 3065309 has the same problem as the above.

Additionally, in the receiver disclosed in Japanese Utility Model No. 3065309, the photodetector 4 has a light-receptive potion 41 of substantially dome shape while the light guide 9 has a substantially rectangular cross section. Such a configuration prevents the light-receptive portion 41 from receiving a light reflected from the vicinity of the corner in the cross section, thus lowering the light utilization. As the light guide 9 is made of a synthetic resin, it is easy to reduce the production cost of the receiver. However, when the metal mold 10 for use in molding of the light guide 9 is configured to have a rectangular section as shown in FIG. 6, the shrinkage caused by cooling further lowers the light utilization. Accordingly, it is required to take the shrinkage into consideration in designing a metal mold for the light guide 9 having a substantially rectangular cross section, so the designing needs skills. Further, in the signal receiver, an exit end facing the light-receptive portion 41 of the light guide 9 has a concave surface adapted to the dome-shaped light-receptive portion 41, thereby four corners of the exit end projecting downward largely. This may cause an interference between the edge of the light guide 9 and the light-receptive portion 41 when the front panel 2 is attached to the main body of the receiver. In order to permit a smooth attachment of the front panel 2, a large space is needed between the two, thus the light sensitivity is lowered.

SUMMARY OF THE INVENTION

The present invention is made to solve the above-mentioned problems. It is an object of the present invention to provide a signal receiver for a remote control system which is designed to be reduced in production cost and improved in photodetection efficiency.

An aspect of the present invention provides an apparatus for receiving an optical signal from a remote control comprising a front panel provided with a window through which a light including the optical signal passes, a circuit board disposed at substantially a right angle to the front panel, a photodetector mounted on the circuit board in a manner that allows the photodetector to have a directivity in a normal direction on the circuit board, and a light guide attached to the front panel for guiding the light passing through the window toward the photodetector, wherein the light guide is made of a homogeneous material and guides the light with a boundary between an outer surface thereof and the atmosphere reflecting the light totally, a light guiding portion of the light guide extending from an entrance end facing the window to an exit end facing the photodetector has a substantially circular cross section and is curved gently, not angularly, so that the entrance end and the exit end are arranged substantially perpendicular to each other, and a center of the exit end corresponds to a center of the photodetector in a plan view.

According to the present invention, the light guide facilitates a total reflection of a light compared to a light guide having an angular portion because its light guiding portion has a substantially circular cross section and is curved gently, not angularly. Therefore, a light that is passing through the inside of this light guide can be better prevented from leaking outward. Since the center of the exit end corresponds to the center of the photodetector in a plan view, the overlap in a plan view between the exit end and the photodetector becomes relatively large. Thus, light flux passing through the light guide can be efficiently concentrated into the photodetector, whereby the light utilization is enhanced. The light guide is typically made of a material increased in refractive index compared to the atmosphere. By making a single layer light guide out of such a material, a light can be reflected totally by the boundary between its outer surface and the atmosphere so as to be guided.

The photodetector may comprise a substantially dome-shaped light-receptive portion, and the exit end of the light guide may be formed with a concave surface and disposed coaxial with and opposite to the substantially dome-shaped light-receptive portion. In such a configuration, since the concave surface of the exit end and a convex surface of the light-receptive portion are coaxial with and opposite to each other, light flux passing through the light guide can be concentrated into the light-receptive portion, whereby the light utilization is enhanced.

Another aspect of the present invention provides an apparatus for receiving an optical signal from a remote control comprising a front panel provided with a window through which a light including the optical signal passes, a circuit board disposed at substantially a right angle to the front panel, a photodetector having a substantially dome-shaped light-receptive portion mounted on the circuit board in a manner that allows the light-receptive portion to have a directivity in a normal direction on the circuit board, and a light guide attached to the front panel for guiding the light passing through the window toward the photodetector, an entrance end of the light guide facing the window including a Fresnel lens structure, and an exit end of the light guide facing the photodetector including a concave surface, wherein the light guide is made of a homogeneous material and guides the light with a boundary between an outer surface thereof and the atmosphere reflecting the light totally, a light guiding portion of the light guide extending from the entrance end to the exit end has a substantially circular cross section and is curved gently, not angularly, so that the entrance end and the exit end are arranged substantially perpendicular to each other, and the exit end is configured in a manner so that the concave surface is coaxial with axes of both the cross section of the light guiding portion and the substantially dome-shaped light-receptive portion, and the exit end is disposed adjacent and opposite to the light-receptive portion.

According to the aspect of the present invention, since the light guiding portion has a substantially circular cross section and is curved gently, a light that is passing through the inside of the light guide can be better prevented from leaking outward in the same manner as the above. The axis of the concave surface, the axis of the cross section of the light guiding portion, and the axis of the light-receptive portion of substantially dome shape (having a convex surface) are coaxial with each other. Accordingly, the overlap in a plan view between the exit end and the light-receptive portion becomes relatively large, and the concave surface of the exit end and the convex surface of the light-receptive portion are configured to be coaxial with and opposite to each other. Thus, light flux passing through the light guide can be efficiently concentrated into the light-receptive portion, whereby the light utilization is enhanced. By configuring the light guide to have a substantially circular cross section while having a concave surface at the exit end, the amount of the projection can be reduced at the edge of the exit end. Thus, the exit end and the light-receptive portion can be prevented from interfering with each other when the front panel is attached to a main body of the signal receiver. As a result, the exit end can be extended to the vicinity of the light-receptive portion, whereby the photodetector can be improved in sensitivity. The light guide is typically made of a material increased in refractive index compared to the atmosphere. By making a single layer light guide out of such a material, a light can be reflected totally by the boundary between its outer surface and the atmosphere to be guided.

BRIEF DESCRIPTION OF THE DRAWINGS

FIG. 3 is a sectional view for showing an A-A section (B-B section) of the light guide.

FIG. 4 is a sectional view for showing the A-A (B-B) section of the light guide and the same section of a metal mold for forming the light guide.

DETAILED DESCRIPTION OF THE PREFERRED EMBODIMENT OF THE PRESENT INVENTION

Figure 1:
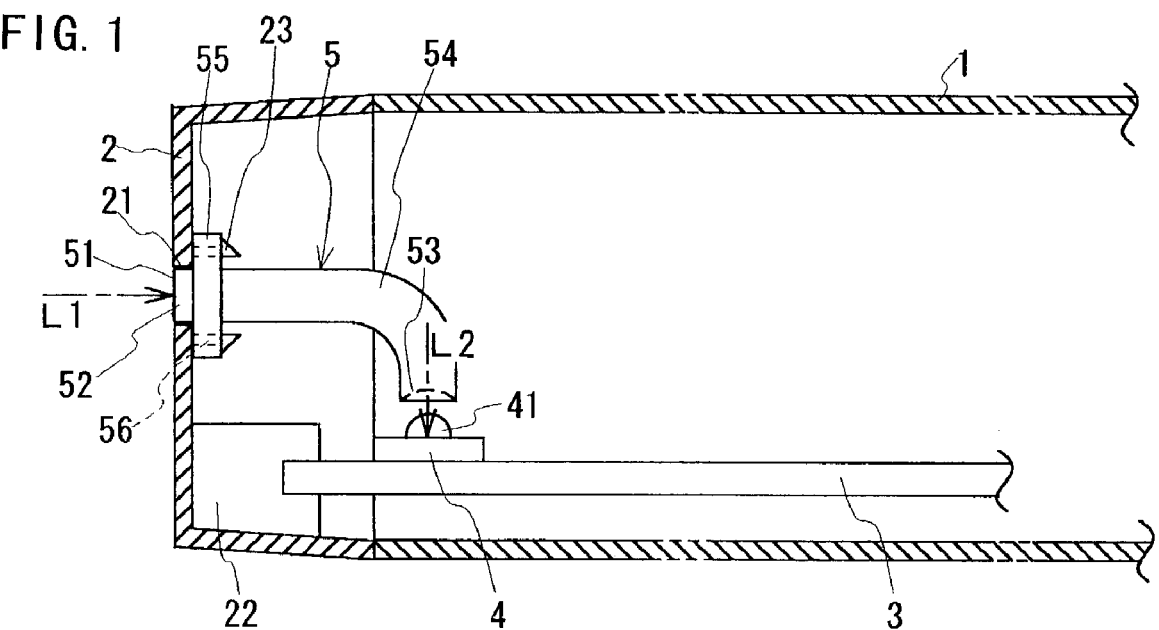
FIG. 1 is a sectional view for showing a construction of a signal receiver according to an embodiment of the present invention.

Now, a signal receiver according to an embodiment of the present invention will be described with reference to the accompanying drawings. FIG. 1 illustrates a cross sectional view of the signal receiver. The signal receiver is provided for receiving an optical signal on infrared rays or the like transmitted from a remote control and converting the optical signal into an electric signal, and it is applied to electronic machines such as a videocassette recorder. The signal receiver comprises a front panel 2 attached to the front side of an outer casing 1, a circuit board 3 disposed at substantially a right angle to the front panel 2, a photodetector 4 mounted on the circuit board 3, a light guide 5 for guiding toward the photodetector 4 an optical signal passing through a window 21 provided at the front panel 2.

The front panel 2 includes, in addition to the window 21 for receiving an optical signal, a stand 22 for holding the circuit board 3 and a couple of claws 23 for engaging with the light guide 5 on the inside. Although optical signals are mainly transmitted from a substantially normal direction on the front panel 2 to be received through the window 21, a Fresnel lens 51 provided at the light guide 5 allows even an optical signal transmitted to the window 21 from a direction varied vertically and/or horizontally to be received so as to be directed toward the light guide 5. An electronic component such as a CPU (not shown) for executing different signal processing and the photodetector 4 are mounted on the circuit board 3, which engages with the stand 22 of the front panel 2. The photodetector 4 has a light-receptive portion 41 of substantially dome shape. The photodetector 4 is mounted upwardly and directly on the circuit board 3 in a manner so that it has a directivity L2 in the normal direction on the circuit board 3. As can be seen from FIG. 1, a direction L1 in which an optical signal enters and the direction of directivity L2 of the photodetector 4 are perpendicular to each other. Generally, the window 21 and the photodetector 4 are positioned depending on requirements in apparatus designing and circuit designing. In accordance with the above-mentioned construction, by varying appropriately the configuration of a light guiding portion 54 of the light guide 5, the designing can be performed flexibly.

Figure 2:
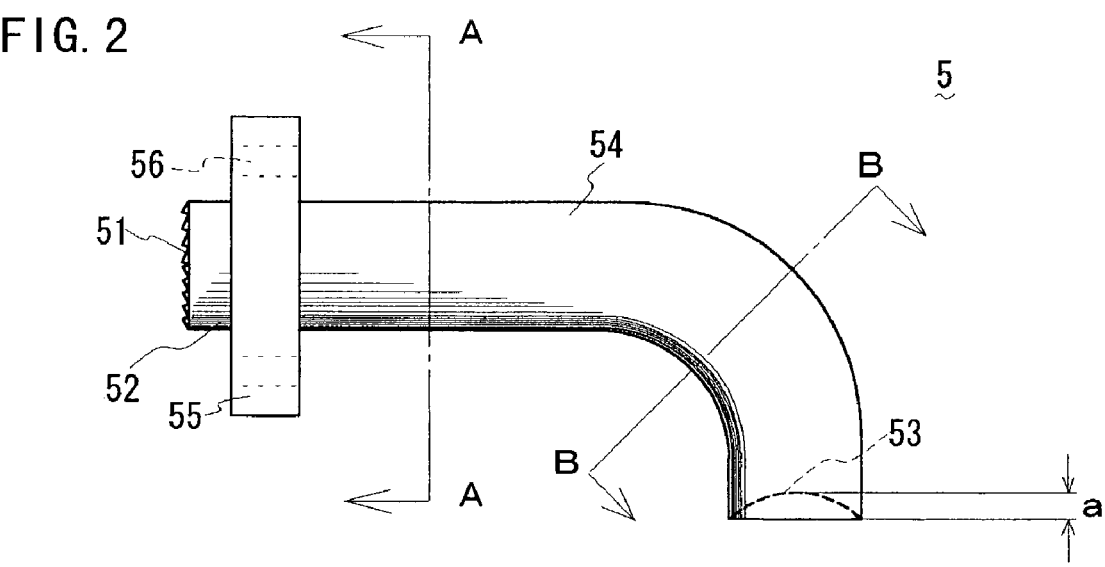
FIG. 2 is a side view for showing a light guide employed in the signal receiver.
Figure 5:
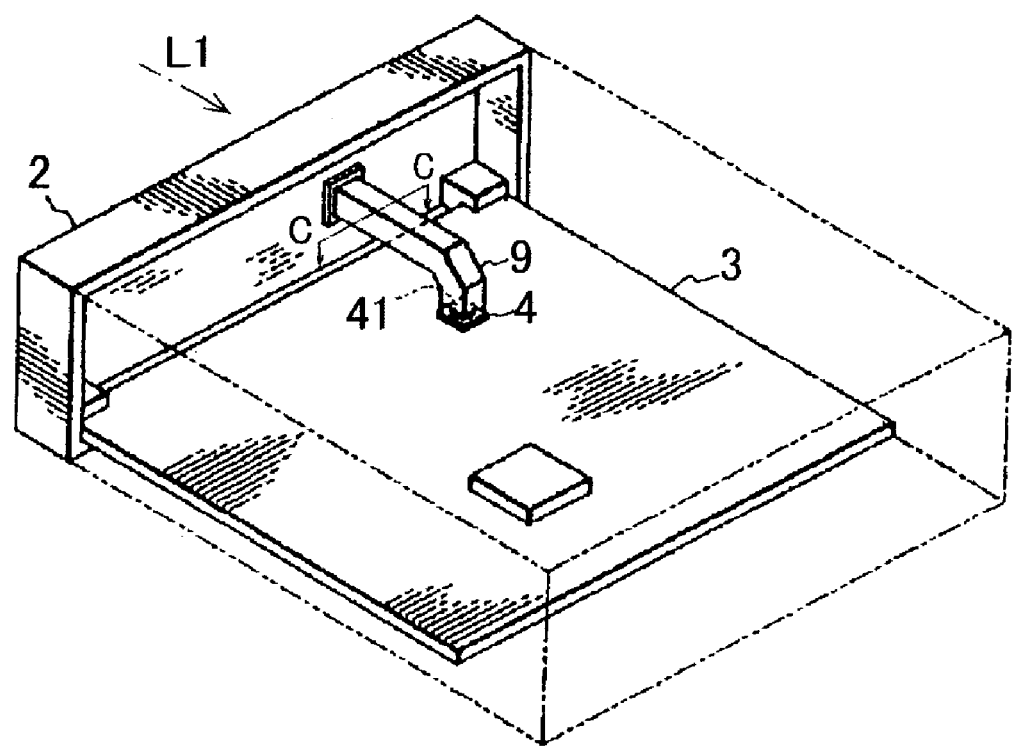
FIG. 5 is a perspective view for showing a construction of a conventional signal receiver.
Figure 6:
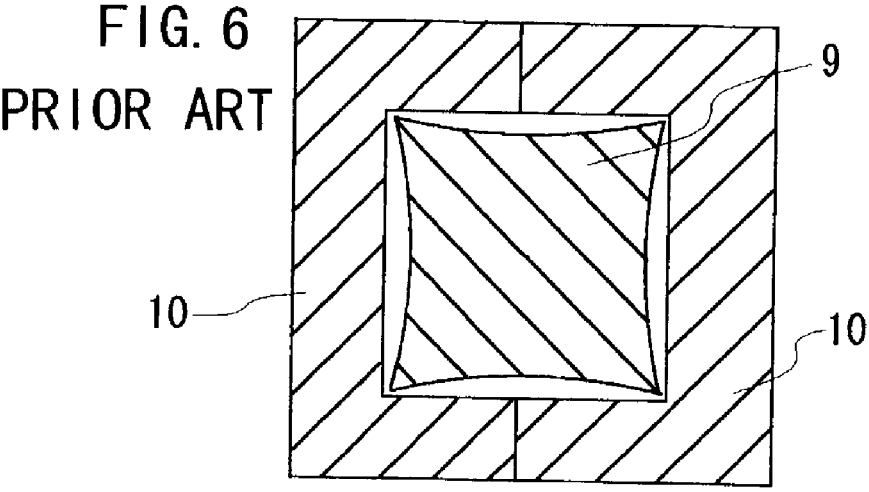
FIG. 6 is a sectional view for showing a C-C section of a light guide employed in the conventional signal receiver and the same section of a metal mold for forming the light guide.

FIG. 2 illustrates a side view of the light guide 5, and FIG. 3 shows its A-A section (or B-B section). The light guide 5 is made of a homogeneous synthetic resin which is translucent and increased in refractive index compared to the atmosphere, thereby guiding a light with a boundary between its outer surface and the atmosphere reflecting the light totally. The light guide 5 includes an entrance end 52 facing the window 21, an exit end 53 facing the photodetector 4, the light guiding portion 54 for guiding an optical signal from the entrance end 52 to the exit end 53, a flange 55 for use in the attachment to the front panel 2. The light guide 5 is held by the front panel 2 with the couple of claws 23 passing through a couple of through holes 56 provided at the flange 55.

The light guiding portion 54 has a substantially circular cross section evenly from the entrance end 52 to the exit end 53 and is curved gently, not angularly. This facilitates a total reflection of a light, compared to a light guide having an angular portion. Accordingly, a light which is passing through the inside of the light guide 5 can be better prevented from leaking outward.

The entrance end 52 of the light guide 5 is provided with the Fresnel lens 51 so that optical signals can be received at various angles. The exit end 53 of the light guide 5 has a concave surface for concentrating light flux into the light-receptive portion 41. The concave surface is coaxial with the axes of both the cross section of the light guiding portion 54 and the substantially dome-shaped light-receptive portion 41. Therefore, the center of the exit end 53 corresponds to the center of the light-receptive portion 41 in a plan view. The exit end 53 is configured to have the concave surface and to be coaxial with and opposite to the dome shape of the light-receptive portion 41. Accordingly, the overlap in a plan view between the exit end 53 and the light-receptive portion 41 becomes relatively large. Thus, light flux passing through the light guide 5 can be efficiently concentrated into the light-receptive portion 41, whereby the light utilization can be enhanced. The stand 22 provided at the front panel 2 for engaging with the circuit board 3 permits the positioning of the circuit board 3 with respect to the front panel 2 to be determined. Thus, the light-receptive portion 41 of the photodetector 4 mounted on the circuit board 3 can be located so as to be coaxial with the exit end 53.

FIG. 4 shows the A-A section of the light guide 5 and the same section of a metal mold 7 for forming the light guide 5. As the light guide 5 employed in the signal receiver of the present invention has a substantially circular cross section, it shrinks in molding substantially evenly around the whole circumference. This eliminates the problem of shrinkage by cooling, thus facilitating the designing of the metal mold.

Preferably, the exit end 53 of the light guide 5 and the light-receptive portion 41 are disposed adjacent to each other, if only the light sensitivity of the light-receptive portion 41 is paid attention to. Since the light guide 5 in this signal receiver has a substantially circular cross section without any angular portion, the amount "a" of the projection can be decreased at the edge of the exit end 53. This prevents the exit end 53 and the light-receptive portion 41 from interfering with each other when the front panel 2 is attached, whereby the exit end 53 can be extended to the vicinity of the light-receptive portion 41.

As described above, in the signal receiver of the present invention, the light guiding portion 54 of the light guide 5 has a substantially circular cross section and is curved gently, not angularly. This facilitates the total reflection of a light, compared to a light guide having angular portions. Consequently, a light that is passing through the inside of the light guide 5 can be better prevented from leaking outward, whereby the light utilization can be enhanced.

The exit end 53 of the light guide 5 is configured so that its center corresponds, in a plan view, to the center of the light-receptive portion 41. Thus, the overlap in a plan view between the exit end 53 and the light-receptive portion 41 is relatively large. This enables light flux passing through the light guide 5 to be efficiently concentrated into the light-receptive portion 41, thereby enhancing the light utilization.

As described above, since the light guide 5 has a substantially circular cross section, the amount "a" of the projection can be decreased at the edge of the exit end 53. This enables the light-receptive portion 41 and the exit end 53 to be disposed adjacent to each other while preventing the two from interfering with each other, thus enhancing the sensitivity of the photodetector 4.

Making the light guide 5 out of a homogeneous material increased in refractive index compared to the atmosphere permits the boundary between the outer surface of the light guide 5 and the atmosphere to be utilized as a total reflection surface. Accordingly, an expensive two-layered light guide such as an optical fiber is not needed, whereby the signal receiver can be reduced in production cost.

The present invention can be modified in various ways without being limited to the embodiment described above. For example, while it is preferable that the photodetector 4 having the substantially dome-shaped light-receptive portion 41 is employed in combination with the exit end 53 having the concave surface coaxial with and opposite to the photodetector 4, the light-receptive portion 41 and the exit end 53 can be configured in varied manners. The light guide 5 may be attached to the front panel 2, for example, by an additional frame, instead of being held with the claws 23 passing through the through holes 56 as shown in FIG. 1.

What is claimed is:

1. An apparatus for receiving an optical signal from a remote control, comprising:
   a front panel provided with a window through which a light including the optical signal passes;
   a circuit board disposed at substantially a right angle to the front panel;
   a photodetector mounted on the circuit board in a manner that allows the photodetector to have a directionality in a normal direction on the circuit board; and
   a light guide attached to the front panel for guiding the light passing through the window toward the photodetector;
   wherein the light guide comprises homogenous material and guides the light with a boundary between an outer surface thereof and the atmosphere reflecting the light totally;
   wherein a light guiding portion of the light guide extending from an entrance end of the light guide facing the window to an exit end of the light guide facing the photodetector has a substantially circular cross section and is curved gently and non-angularly such that the entrance end and the exit end are arranged substantially perpendicular to each other;
   wherein the exit end includes a concave surface, is configured to be coaxial with and opposite to a shape of a light-receptive portion of the photodetector, and is adjacent to the light-receptive portion;
   wherein a center of the exit end corresponds to a center of the photodetector in a plan view; and
   wherein the photodetector comprises a substantially dome-shaped light-receptive portion, and the exit end of the light guide is coaxial with and opposite to the substantially dome-shaped light-receptive portion.

2. The apparatus for receiving an optical signal from a remote control according to claim 1, wherein the front panel is provided with a stand for holding the circuit board on the inside.

3. The apparatus for receiving an optical signal from a remote control according to claim 1, wherein the front panel comprises claws for engaging with the light guide; and
   wherein the light guide comprises a flange by which the light guide is attached to the front panel, the light guide being held by the front panel with the claws passing through corresponding holes provided at the flange.

4. The apparatus for receiving an optical signal from a remote control according to claim 1, wherein the light guide comprises a homogenous synthetic resin that is translucent and increased in refractive index relative to the atmosphere.

5. An apparatus for receiving an optical signal from a remote control, comprising:
   a front panel provided with a window through which a light including the optical signal passes;
   a circuit board disposed at substantially a right angle to the front panel;
   a photodetector having a substantially dome-shaped light-receptive portion mounted on the circuit board in a manner that allows the light-receptive portion to have a directivity in a normal direction on the circuit board; and
   a light guide attached to the front panel for guiding the light passing through the window toward the photodetector, an entrance end of the light guide facing the window including a Fresnel lens structure, and an exit end of the light guide facing the photodetector including a concave surface;
   wherein the light guide comprises homogenous material and guides the light with a boundary between an outer surface thereof and the atmosphere reflecting the light totally;
   wherein a light guiding portion of the light guide extending from the entrance end to the exit end has a substantially circular cross section and is curved gently and non-angularly such that the entrance end and the exit end are arranged substantially perpendicular to each other; and
   wherein the exit end is configured such that the concave surface is coaxial with axes of the cross section of the light guiding portion and the substantially dome-shaped light-receptive portion, and the exit end is adjacent and opposite to the light-receptive portion.

* * * * *